(12) United States Patent
Komatsu (10) Patent No.: US 8,072,645 B2
(45) Date of Patent: Dec. 6, 2011

(54) IMAGE PROCESSING METHOD AND APPARATUS EXECUTING COLOR CORRECTION BASED ON COLOR DOMAIN SPECIFIED BY USER AND DETERMINED RELATIVE TO IMAGE SOURCE

(75) Inventor: Manabu Komatsu, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 690 days.

(21) Appl. No.: 12/132,881

(22) Filed: Jun. 4, 2008

(65) Prior Publication Data

US 2008/0309994 A1    Dec. 18, 2008

(30) Foreign Application Priority Data

Jun. 12, 2007    (JP) ................... 2007-155767

(51) Int. Cl.
*H04N 1/60* (2006.01)
(52) U.S. Cl. .................. 358/1.9; 358/518; 358/527
(58) Field of Classification Search .............. 358/1.9, 358/518, 520, 524, 527, 530; 348/231.3, 348/231.6; 345/591, 604, 589, 590, 593, 345/594; 382/167
See application file for complete search history.

(56) References Cited

U.S. PATENT DOCUMENTS

| | | | | |
|---|---|---|---|---|
| 5,243,414 A | * | 9/1993 | Dalrymple et al. | 358/518 |
| 5,519,515 A | * | 5/1996 | Komatsu | 358/518 |
| 5,710,872 A | * | 1/1998 | Takahashi et al. | 358/1.9 |
| 6,337,692 B1 | * | 1/2002 | Rai et al. | 345/594 |
| 7,233,694 B2 | * | 6/2007 | Fukui | 382/162 |
| 7,760,393 B2 | * | 7/2010 | Matsui et al. | 358/1.9 |
| 7,764,411 B2 | * | 7/2010 | Kishimoto | 358/518 |
| 7,777,906 B2 | * | 8/2010 | Namikata | 358/1.9 |
| 2007/0002346 A1 | * | 1/2007 | Nakane | 358/1.9 |
| 2007/0229867 A1 | * | 10/2007 | Suzuki | 358/1.9 |

FOREIGN PATENT DOCUMENTS

| | | |
|---|---|---|
| JP | 2721174 | 11/1997 |
| JP | 3713352 | 8/2005 |
| JP | 2006-238321 | 9/2006 |
| JP | 2006-287479 | 10/2006 |
| JP | 2007-88783 | 4/2007 |

OTHER PUBLICATIONS

Office Action issued in Japanese Patent Application No. 2007-155767 drafted Jul. 8, 2011 (English Machine Translation).*

Office Action issued in Japanese Patent Application No. 2007-155767.

* cited by examiner

*Primary Examiner* — Scott A Rogers
(74) *Attorney, Agent, or Firm* — Oblon, Spivak, McClelland, Maier & Neustadt, L.L.P.

(57) ABSTRACT

In an image processing method, a color corresponding to an input color image signal represented by an arbitrary RGB color space is detected and a requested color correction process is executed. A color domain according to property of the RGB color space is determined when determining a color domain based on a two-dimensional image signal representing a color plane converted from the input color image signal.

12 Claims, 7 Drawing Sheets

COLOR DIVISION MASKING UNIT 300

FIG. 6

FIG. 7
BASIC COLOR COMPARISON (a*b*SURFACE)

IMAGE PROCESSING METHOD AND APPARATUS EXECUTING COLOR CORRECTION BASED ON COLOR DOMAIN SPECIFIED BY USER AND DETERMINED RELATIVE TO IMAGE SOURCE

CROSS-REFERENCE TO RELATED APPLICATIONS

The present application claims priority to and incorporates by reference the entire contents of Japanese priority document 2007-155767 filed in Japan on Jun. 12, 2007.

BACKGROUND OF THE INVENTION

1. Field of the Invention

The present invention relates to an image processing method and an image processing apparatus, and, more particularly to a digital multifunction peripheral (MFP) that includes functions of a copying machine, a facsimile, a printer, a scanner etc., an image processing apparatus of a color facsimile, a color printer, a color hardcopy etc., an image processing apparatus related to digital image data and that is suitable for a color-print software application operated on a personal computer, an image processing method, and system configuration thereof.

2. Description of the Related Art

With the development of reading units that use a line sensor made of a charge-coupled device (CCD) photoelectric conversion element and toner-writing devices that use laser irradiation, digital copying machines came into existence that produce copies in digital image data by using an analog copying machine.

Since the digital copying machine came into existence, compatibility with other devices that handle the digital image data has improved. In addition to serving as a copying machine, the digital copying machine combines various functions such as a facsimile function, a print function, and a scanner function and is known as a digital multifunction peripheral (MFP) than merely a digital copying machine.

Along with increase in memory and decrease in cost of a hard disk drive (HDD), increase in speed and use of communication techniques such as a network, enhanced throughput of a central processing unit (CPU), advancement of MFP-related techniques such as digital image data-related techniques (compression techniques etc.), the number of functions included in the MFPs has increased.

However, usage of the MFP is also diversified. For example, a pair of compact MFPs is placed next to a personal computer (PC) and an operator can easily use the functions of the copying machine, the facsimile, the printer, and the scanner that are included in the MFPs. Medium-sized MFPs also exist that are shared by a plurality of users in various departments or sections. The medium-sized MFPs have a certain degree of productivity and that include the functions of sorting, punching, stapling etc. Large-size MFPs that have high productivity, high quality, and multiple functions are used in departments that provide centralized copying-related services for an entire company, or in companies engaged in copying-related services.

Thus, there are various types of MFPs from compact MFPs to large-size MFPs. The MFPs include functions that can be shared by various classes and also include the functions that are strongly demanded for each class. For example, the large-size MFPs that can perform finishing work such as punching, stapling, and folding after paper plotting, and that can simultaneously perform copying and electronic filing are in demand. Further, the compact MFPs with enhanced internet fax and PC-fax etc., high-quality image printing on exclusive papers for personal use etc. are in demand.

Thus, various new functions are provided, and it is desirable to provide and integrate new functions also in the MFPs that handle digital image data, which is a part of the digital data. However, in a vast MFP market, conventionally a system was developed and marketed that had functions dedicated to each class.

The importance of information value in business is already accepted. The information should be conveyed faster, more accurately, and more authentically, and also in a simplified and effective manner. Along with increase in speed and use of communication techniques, increase in memory, decrease in cost and size of storage devices, and increase in PC performance, new functions are provided that effectively handle the digital data. It is desirable to provide and integrate new functions also in the MFPs that handle the digital image data, which is a part of the digital data.

If development and integration of new functions in the MFPs continues, a following case can be assumed. In a digital color MFP equipped with various color image input-output devices, for color images imported using a scanner and color documents created using an application on the PC, color correction and color processing are executed according to colors detected. Further, a printout is taken after converting to printer control signals (cyan, magenta, yellow, and black (CMYK)) and image distribution is done via an external interface (I/F) after converting to standard signals such as standard red, green, and blue (sRGB).

Known technologies related to the present invention are disclosed in the following disclosures, namely, Japanese Patent Nos. 2721174 and 3713352, and Japanese Patent Application Laid-open No. 2007-88783.

As described in Japanese Patent Nos. 2721174 and 3713352, a color domain that includes colors indicated by image signals is determined, predetermined parameters are selected depending on the determined domain, and the image signals are processed based on the selected parameters. Due to this, color correction, color processing, color adjustment etc. can be flexibly carried out. However, when handling several colors, various problems regarding color correction are encountered.

For example, as described in Japanese Patent No. 3713352, hues are derived by converting from red, green, and blue (RGB) image signals into two-dimensional image signals that represent a color plane. However, even though hues are detected for the RGB signals imported by using the scanner, and for example, standard display RGB signals such as sRGB handled on the PC, the same color domain is determined, and color correction and color processing are executed, characteristics of the RGB signals differ. Therefore, conversion results requested for both input images cannot be obtained.

Figure 8:
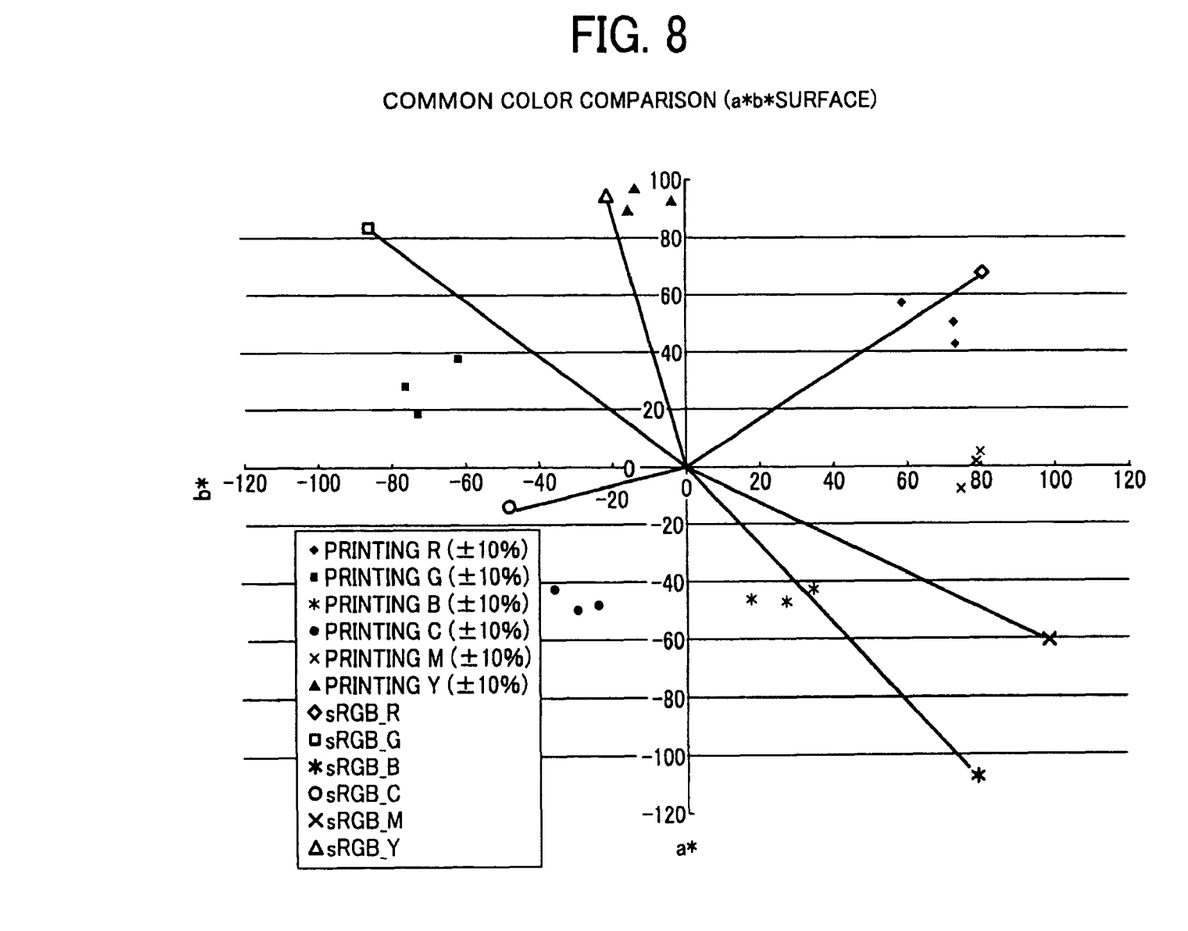
FIG. 8 is a graph for explaining how a basic color definition (chromaticity point) of colors on a display (light-source color) differs from the colors of printed matter (reflection copies) created on paper.

As described in Japanese Patent Application Laid-open No. 2007-88783, even when characteristics of the RGB signals that are handled internally are matched, as shown in FIG. 8, a definition (chromaticity point) of basic hues such as cyan (C), magenta (M), and green (G) differs in paper printouts (reflection copy) and in the colors on display (light-source colors). Therefore, even though the common RGB signals are converted into the two-dimensional image signals, the colors are derived, and color correction and color processing are executed, the conversion results requested for the images imported from the scanner and the images created on the PC cannot be obtained.

SUMMARY OF THE INVENTION

It is an object of the present invention to at least partially solve the problems in the conventional technology.

According to an aspect of the present invention, there is provided an image processing method of detecting a color corresponding to an input color image signal represented by an arbitrary RGB color space and executing a requested color correction process. The image processing method includes determining a color domain according to property of the RGB color space when determining a color domain based on a two-dimensional image signal representing a color plane converted from the input color image signal.

Furthermore, according to another aspect of the present invention, there is provided an image processing apparatus including an image reading unit that reads a document to obtain digital image data of the document; an image writing unit that prints the image data on a recording medium; a storing unit that stores therein the image data and metadata of the image data; an external interface unit that exchanges the image data and the metadata with an external device; a first image data processing unit that processes the image data from the image reading unit; a second image data processing unit that processes the image data from the storing unit; and a bus control unit that connects the image reading unit, the image writing unit, the storing unit, the external interface unit, the first image data processing unit, and the second image data processing unit with each other. The first image data processing unit converts the input image data into an RGB signal with unified property. The second image data processing unit detects the color domain based on a two-dimensional image signal representing a color plane converted from the RGB signal with unified property and determines the color domain according to the metadata when executing a color correction process corresponding to a requested color domain.

Moreover, according to still another aspect of the present invention, there is provided an image processing apparatus including an image reading unit that reads a document to obtain digital image data of the document; an image writing unit that prints the image data on a recording medium; a storing unit that stores therein the image data and metadata of the image data; an external interface unit that exchanges the image data and the metadata with an external device; a first image data processing unit that processes the image data from the image reading unit; a second image data processing unit that processes the image data from the storing unit; and a bus control unit that connects the image reading unit, the image writing unit, the storing unit, the external interface unit, the first image data processing unit, and the second image data processing unit with each other. The first image data processing unit converts the input image data into an RGB signal with unified property. The second image data processing unit detects the color domain based on a two-dimensional image signal representing a color plane converted from the RGB signal with unified property and determines the color domain according to the metadata and an image output condition when executing a color correction process corresponding to a requested color domain.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the image processing method and the image processing apparatus are explained below with reference to the accompanying drawings.

Figure 1:
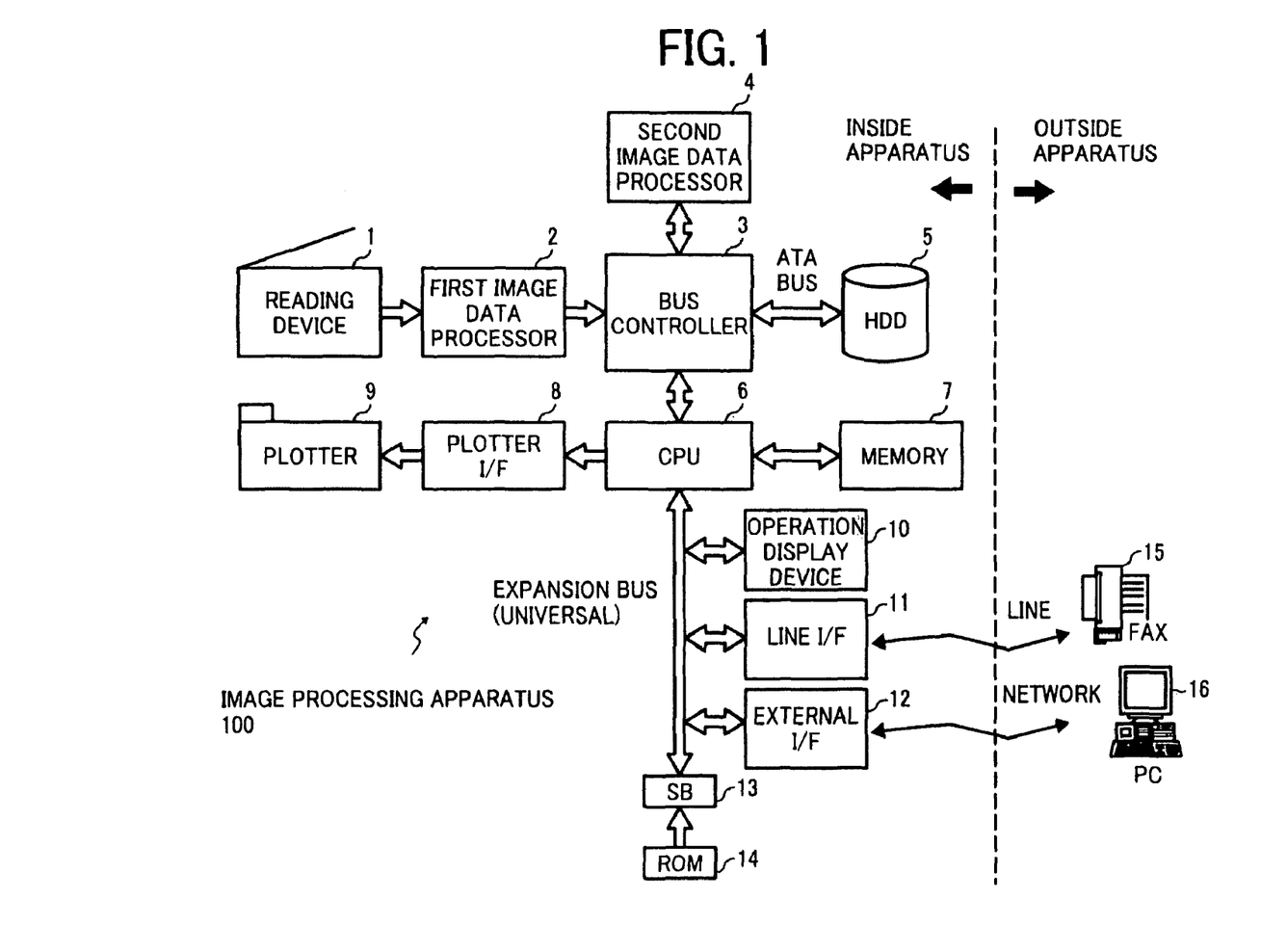
FIG. 1 is a schematic for explaining a general structure of an image processing apparatus according to an embodiment of the present invention.

FIG. 1 is a schematic for explaining a general structure of an image processing apparatus (MFP) 100 according to an embodiment of the present invention.

As shown in FIG. 1, a reading unit 1 includes a line sensor made of a CCD photoelectric conversion element, an analog-to-digital (A/D) converter, and drive circuits thereof. Based on a density data of an original that is obtained by scanning the set original, the reading unit 1 generates and outputs an 8-bit red, green, and blue (RGB) digital image data. A first image data processing unit 2 performs a process to match characteristics of the digital image data received from the reading unit 1 to predetermined characteristics and outputs the processed digital image data. The processed image data is stored in the MFP and matched characteristics are changed to fit the characteristics suitable for an output terminal when reused afterwards. The details are described later.

A bus control unit 3 is a data bus control unit that performs exchange of various data such as essential image data and control commands within the image processing apparatus 100 and also functions as a bridge between a plurality of bus standards. In the present embodiment, the bus control unit 3 is connected to the first image data processing unit 2, a second image data processing unit 4, and a CPU 6 via a PCI-Express bus, and connected to an HDD via an advanced technology attachment (ATA) bus, and application specific integrated circuits (ASIC) are implemented. For the digital image data in which the predetermined characteristics are matched by the first image data processing unit 2, the second image data processing unit 4 executes an image process suitable for an output terminal specified by a user and outputs the digital image data. The details are described later.

An HDD 5 is a large-size memory device that is used to store electronic data in desktop personal computers. The HDD 5 mainly stores the digital image data and metadata of the digital image data in the image processing apparatus 100. In the present embodiment, a hard disk having an ATA bus connection that is standardized by enhancing an integrated development environment (IDE) is used. The CPU 6 is a microprocessor that controls the entire image processing apparatus 100. In the present embodiment, an integrated CPU is employed, which is widely used recently in which +α functions are added to a single CPU core having connection functions of a universal standard interface (I/F) and integrated bus connection functions using crossbar switches.

A memory 7 is a volatile memory that stores data that is temporarily exchanged to compensate differences in speed when bridging between a plurality of bus standards and also differences in processing speed of connected components. Further, the memory 7 temporarily stores programs and intermediate process data when the CPU 6 controls the image processing apparatus 100. Because the CPU 6 is desired to perform at a high processing speed, at the time of normal booting, system is started using a boot program stored in a read-only memory (ROM). After that, processing is done by using a program developed by the memory 7, which is accessible at high speed. In the present embodiment, a dual in-line memory module (DIMM) used in a standardized personal computer is used as the memory 7.

Upon receiving the digital image data made of cyan, magenta, yellow, and black (CMYK) that is transferred via the universal standard I/F integrated in the CPU 6, a plotter I/F 8 performs a bus bridge process that is output to an exclusive I/F of a plotter 9. In the present embodiment, the PCI-Express bus is used as the universal standard I/F.

Upon receiving the digital image data made of CMYK, the plotter 9 outputs the received image data to transfer sheets using an electrophotographic process that uses laser beams. A south bridge (SB) 13 is one of the chipsets used in the personal computers and that is a universal electronic device. In the present embodiment, the SB 13 bridges between the ROM and the CPU 6 mainly because a bus bridge function, which is often used when developing a CPU system that includes the PCI-Express and an industry standard architecture (ISA) bridge, is converted into a universal circuit.

A read-only memory (ROM) 14 stores a program (including boot program) when the CPU controls the image processing apparatus 100.

An operation display unit 10 is an interface between the image processing apparatus 100 and the user, and includes a liquid crystal display (LCD) and a key switch. The operation display unit 10 displays various states of the apparatus and modes of operation on the LCD, and detects key switch inputs from the user. In the present embodiment, the operation display unit 10 is connected to the CPU 6 via the PCI-Express bus. A line I/F 11 connects the PCI-Express bus and a telephone line. The image processing apparatus 100 can exchange various data via the telephone line by using the line I/F 11.

A fax 15 is a normal facsimile machine that exchanges the image data with the image processing apparatus 100 via the telephone line. An external I/F 12 connects the PCI-Express bus and the external devices, and the image processing apparatus 100 can exchange various data with the external devices using the external I/F 12. In the present embodiment, a network (Ethernet) is used for connection I/F. In other words, the image processing apparatus 100 is connected to the network via the external I/F 12. A PC 16 is a personal computer and the user inputs and outputs various controls and image data to and from the image processing apparatus 100 via application software and drivers that are installed in the personal computer.

The user sets the original on the reading unit 1, sets a requested mode etc. in the operation display unit 10, and operates the operation display unit 10 to start copying. The operation display unit 10 converts the data that is input by the user and issues in the form of control command data inside the device. The issued control command data is notified to the CPU 6 via the PCI-Express bus.

Based on copy-start control command data, the CPU 6 executes a program of copying process and sequentially carries out settings and operations necessary for copying.

The copying process is sequentially explained below. The 8-bit RGB digital image data that is obtained by scanning the original using the reading unit 1 is matched with the predetermined characteristics by the first image data processing unit 2 and is transferred to the bus control unit 3. The bus control unit 3 receives RGB image data from the first image data processing unit 2 and stores to the memory 7 via the CPU 6. Further, the RGB image data stored in the memory 7 is transferred to the second image data processing unit 4 via the CPU 6 and the bus control unit 3.

The second image data processing unit 4 converts the received RGB image data and outputs in the form of CMYK image data for plotter output. The bus control unit 3 receives the CMYK image data from the second image data processing unit 4 and stores to the memory 7 via the CPU 6. The CMYK image data stored in the memory 7 is transferred to the plotter 9 via the CPU 6 and the plotter I/F 8. The plotter 9 outputs the received CMYK image data to the transfer sheets and copies of the original are produced.

The user sets the original on the reading unit 1, sets the requested mode etc. in the operation display unit 10, and operates the operation display unit 10 to start fax transmission. The operation display unit 10 converts the data that is input by the user and issues in the form of the control command data inside the device. The issued control command data is notified to the CPU 6 via the PCI-Express bus. Based on a fax transmission start control command data, the CPU 6 executes a fax transmission process and sequentially carries out the settings and operations necessary for fax transmission.

The fax transmission process is sequentially explained below. The 8-bit RGB digital image data that is obtained by scanning the original using the reading unit 1 is matched with the predetermined characteristics by the first image data processing unit 2 and is transferred to the bus control unit 3. The bus control unit 3 receives the RGB image data from the first image data processing unit 2 and stores to the memory 7 via the CPU 6. Further, the RGB image data stored in the memory 7 is transferred to the second image data processing unit 4 via the CPU 6 and the bus control unit 3.

The second image data processing unit 4 converts the received RGB image data and outputs in the form of monochrome binary image data. The bus control unit 3 receives the monochrome binary image data from the second image data processing unit 4 and stores to the memory 7 via the CPU 6. Further, the monochrome binary image data is transferred to the line I/F 11 via the CPU 6. The line I/F 11 faxes the received monochrome binary image data to the fax 15 that is connected via the telephone line.

The user sets the original on the reading unit 1, sets the requested mode etc. in the operation display unit 10, and operates the operation display unit 10 to start scanner distribution. The operation display unit 10 converts the data that is input by the user and issues in the form of the control command data inside the device. The issued control command data is notified to the CPU 6 via the PCI-Express bus. Based on a scanner distribution start control command data, the CPU 6 executes a program of scanner distribution process and a scanner sequentially carries out the settings and operations necessary for scanner distribution.

The scanner distribution process is sequentially explained below. The 8-bit RGB digital image data that is obtained by scanning the original using the reading unit 1 is matched with the predetermined characteristics by the first image data processing unit 2 and is transferred to the bus control unit 3. The bus control unit 3 receives the RGB image data from the first image data processing unit 2 and stores to the memory 7 via the CPU 6. Further, the RGB image data stored in the memory 7 is transferred to the second image data processing unit 4 via the CPU 6 and the bus control unit 3. The second image data processing unit 4 converts the received RGB image data and outputs in the form of scanner distribution image data. (RGB multivalued, gray-scale, monochrome binary etc.)

The bus control unit 3 receives the image data from the second image data processing unit 4 and stores to the memory 7 via the CPU 6. Further, the image data stored in the memory 7 is transferred to the external I/F 12 via the CPU 6. The external I/F 12 transfers the received image data to the PC 16 that is connected via the network.

In the present embodiment, an operation when the image data obtained by scanning the original is stored and saved in the digital image processing apparatus 100, and the stored and saved image data is reused later is explained below.

The user sets the original on the reading unit 1, sets the requested mode etc. in the operation display unit 10, and operates the operation display unit 10 to start copying. The operation display unit 10 converts the data that is input by the user and issues in the form of the control command data inside the device. The issued control command data is notified to the CPU 6 via the PCI-Express bus. Based on the copying start control command data, the CPU 6 executes the program of copying process and sequentially carries out the settings and operations necessary for copying.

The copying process is sequentially explained below. The 8-bit RGB digital image data that is obtained by scanning the original using the reading unit 1 is matched with the predetermined characteristics by the first image data processing unit 2 and is transferred to the bus control unit 3.

Figure 2:
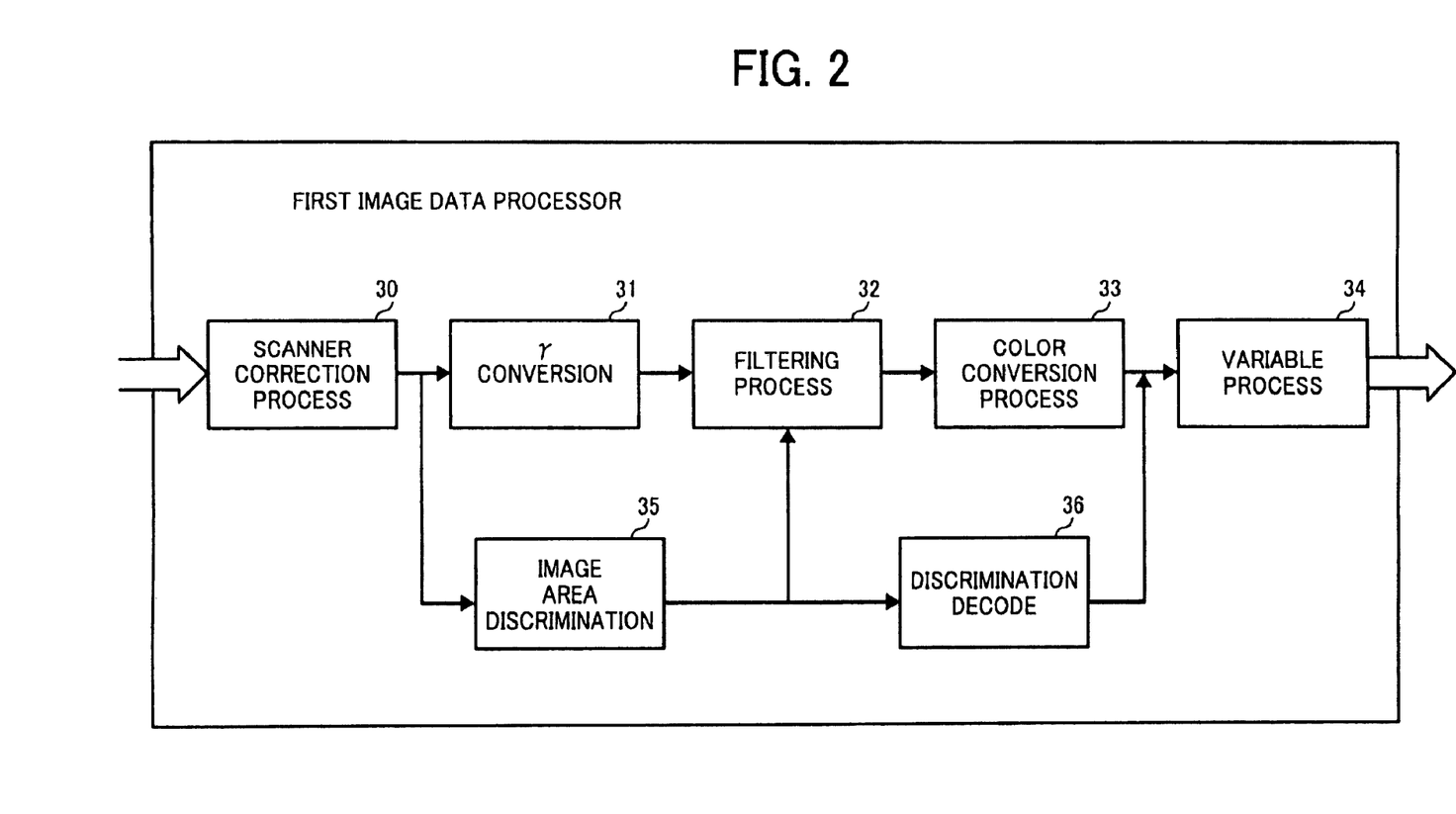
FIG. 2 is a schematic for explaining a process flow in a first image data processing unit according to the embodiment of the present invention.

FIG. 2 is a schematic for sequentially explaining a flow of processes performed by the first image data processing unit 2.

A γ conversion process 31 involves matching brightness of the RGB image data, which is received from the reading unit 1 after preprocessing in a scanner correction process 30, with the predetermined characteristics. In the present embodiment, the brightness is converted into a brightness-linear characteristic.

A filtering process 32 involves matching sharpness of the RGB image data with the predetermined characteristics. In the present embodiment, when a standard chart is scanned, conversion is carried out such that a modulation transfer function (MTF) characteristic value that is predetermined with respect to the number of lines is obtained.

A color conversion process 33 involves matching colors of the RGB image data with the predetermined characteristics. In the present embodiment, color space characteristics are converted into color spaces such as International Commission on Illumination (CIE)-RGB such that the colors can be universally handled.

A variable process 34 involves matching a size (resolution) of the RGB image data with the predetermined characteristics. In the present embodiment, the size (resolution) is converted into 600 dots per inch (dpi).

The bus control unit 3 receives the image data from the first image data processing unit 2 and stores to the memory 7 via the CPU 6. Further, the image data stored in the memory 7 is transferred to the HDD 5 via the CPU 6 and the bus control unit 3, and stored and saved in the HDD 5.

Subsequently, the RGB image data in the memory 7 is output to the plotter 9 via the second image data processing unit 4 and the copies of the original are produced.

Figure 3:
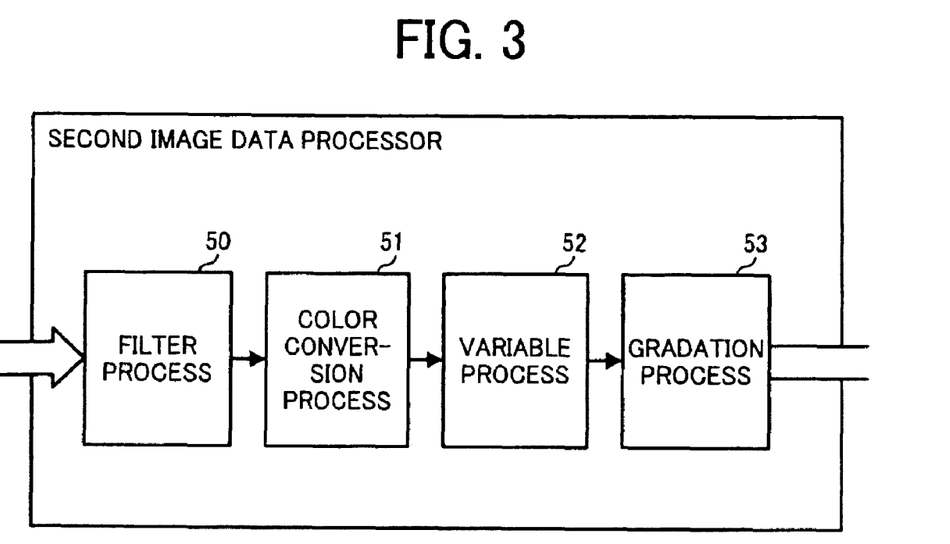
FIG. 3 is a schematic for explaining a process flow in a second image data processing unit according to the embodiment of the present invention.

FIG. 3 is a schematic for sequentially explaining a flow of processes performed by the second image data processing unit 4 and the operations in the processes.

A filter process 50 involves correction of the sharpness of the RGB image data such that the reproducibility is improved when outputting to the plotter 9. Specifically, sharpening and smoothing processes are executed based on the requested mode data. For example, in a character mode, sharpening process is executed to clarify and emphasize the characters, and in a picture mode, smoothing process is executed to present a smooth gradation of a picture.

A color conversion process 51 involves reception and conversion of the 8-bit RGB data into 8-bit CMYK data, which serves as the color spaces for the plotter. At that time, color adjustment and color processing are executed together based on image output mode data requested by the user.

A variable process 52 involves conversion of the CMYK image data size (resolution) according to the reproducibility of the plotter 9. In the present embodiment, because output of the plotter 9 is 600 dpi, special conversion is not carried out.

In a gradation process 53, upon receiving the 8-bit CMYK image data, gradation conversion is carried out based on gradational ability of the plotter 9. In the present embodiment, gradation conversion is done by applying an error diffusion method, which is a type of pseudo-halftone process, to each 2 bits of the 8-bit CMYK image data.

Further, an operation of reusing the image data stored and saved in the HDD 5 is explained.

For the image data that is stored in the HDD 5 upon completion of a previous copy operation, the user sets the requested mode etc. and operates the operation display unit 10 to start the fax transmission. The operation display unit 10 converts the data that is input by the user and issues in the form of the control command data inside the device. The issued control command data is notified to the CPU 6 via the PCI-Express bus. The CPU 6 executes the program of the fax transmission process based on the fax transmission start control command data and sequentially carries out the settings and operations necessary for the fax transmission.

The fax transmission process is sequentially explained below. The bus control unit 3 outputs the RGB image data stored in the HDD 5 to the memory 7 via the CPU 6. Subsequently, the RGB image data stored in the memory 7 is output to the second image data processing unit 4 via the line I/F 11 and the fax transmission is performed.

The operations are sequentially explained with reference to a flow of processes performed by the second image data processing unit 4 that is shown in FIG. 3.

The filter process 50 involves correction of the sharpness of the RGB image data such that the reproducibility is improved when transmitting the fax. Specifically, the sharpening and smoothing processes are performed according to the requested mode data. For example, in the character mode, the sharpening process is performed to clarify and emphasize the characters, and in the picture mode, the smoothing process is performed to present a smooth gradation of the picture.

In the color conversion process 51, the 8-bit RGB data is received and converted into 8 bits of single color (monochrome) data generally used for a fax device. In the variable process 52, the size (resolution) of the monochrome image data is converted into the size (resolution) that is transmitted by the fax device. In the present embodiment, the size (resolution) is converted into main scanning 200 dpi×sub-scanning 100 dpi. In the gradation process 53, upon receiving the 8 bits of monochrome, the gradation conversion process is performed according to the gradational ability used in the fax device. In the present embodiment, conversion is done into binary gradation by using the error diffusion method, which is a type of pseudo-halftone process.

For the image data that is stored in the HDD 5 upon completion of a previous copy operation, the user sets the requested mode etc. and operates the operation display unit 10 to start the scanner distribution. The operation display unit 10 converts the data input by the user and issues in the form of the control command data inside the device. The issued control command data is notified to the CPU 6 via the PCI-Express bus.

The CPU 6 executes the program of the scanner distribution process based on the scanner distribution start control command data and sequentially carries out the settings and operations necessary for the scanner distribution.

The scanner distribution process is sequentially explained below. The bus control unit 3 outputs the RGB image data stored in the HDD 5 to the memory 7 via the CPU 6. Subsequently, the RGB image data stored in the memory 7 is output to the second image data processing unit 4 via the external I/F 12 and the scanner distribution is performed.

The operations are sequentially explained with reference to the flow of the processes performed by the second image data processing unit 4 that is shown in FIG. 3. The filter process 50 involves correction of the sharpness of the RGB image data such that the reproducibility is improved at the time of scanner distribution. Specifically, the sharpening and smoothing processes are performed according to the requested mode data. For example, in the character mode, the sharpening process is performed to clarify and emphasize the characters, and in the picture mode, the smoothing process is performed to present a smooth gradation of the picture.

In the color conversion process 51, the 8-bit RGB data is received and converted into a specified color space. In the present embodiment, the converted color space is an 8-bit sRGB color space that is generally used in the scanner distribution. In the variable process 52, the size (resolution) of the sRGB image data is converted to the size (resolution) that is exchanged in a specified scanner distribution. In the present embodiment, the size (resolution) is converted into main scanning 200 dpi×sub-scanning 200 dpi.

In the gradation process 53, gradation conversion is carried out based on the gradational ability that is used in the specified scanner distribution. In the present embodiment, it is assumed that 1,60,000 colors of 8-bit RGB are specified and no special gradation process is executed. Thus, for the data stored and saved in the digital image processing apparatus 100 (MFP), when a different output terminal than an input source is requested, the output terminal can be changed without changing an image quality compared with the image quality at the time of normal operation (an operation when the output terminal is already specified when no data is stored) and reusability of the data is remarkably improved.

The color conversion process 51 that is shown in FIG. 3 and that is a salient feature of the present invention is explained below.

For the matched RGB image data that is stored, the color conversion process 51 performs color adjustment and color processing depending on color matching processes of RGB to CMYK (plotter output signals) and RGB to sRGB (distribution signals), and a user request.

Figure 4:
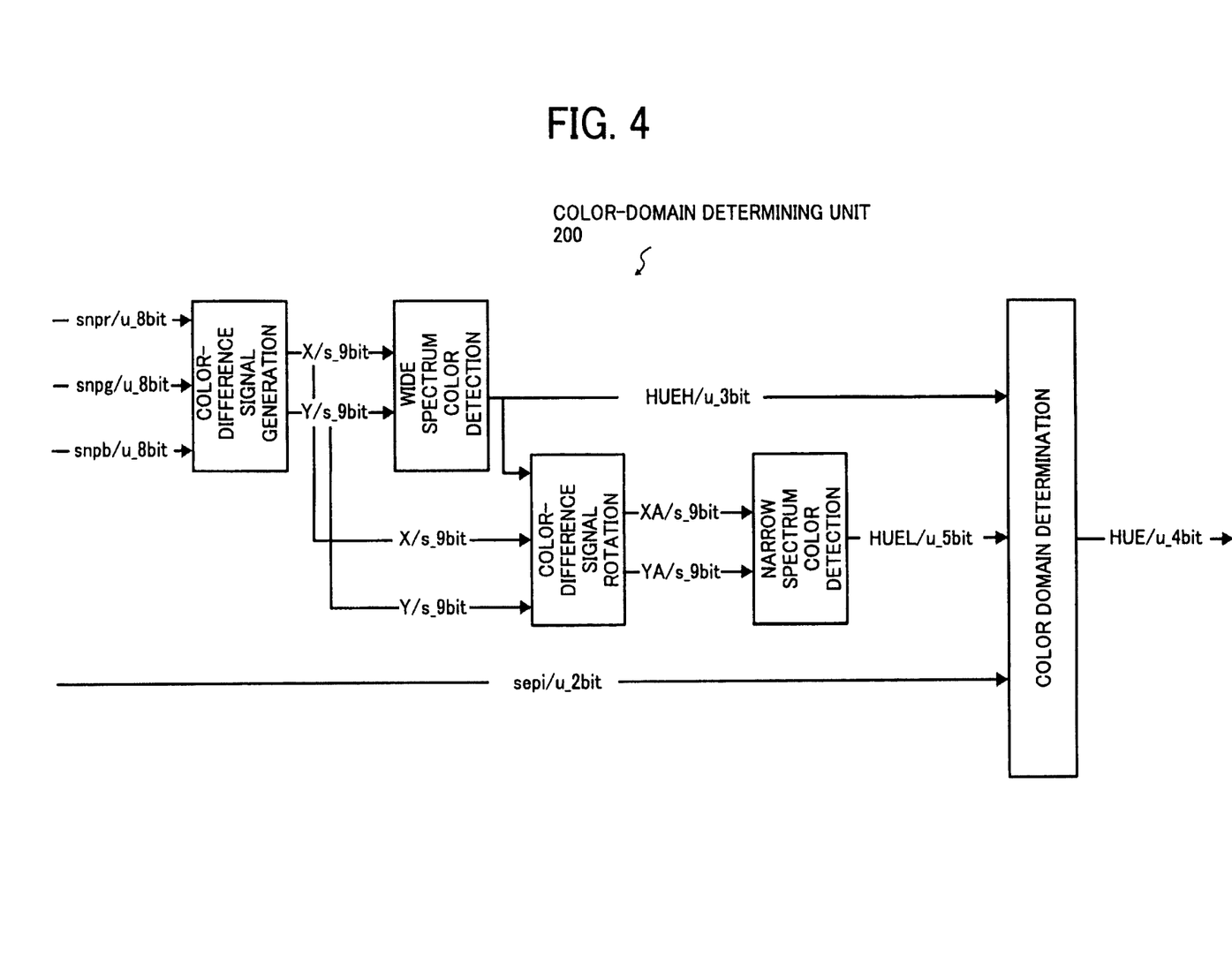
FIG. 4 is a schematic of a structure of a color-domain determining unit.
Figure 5:
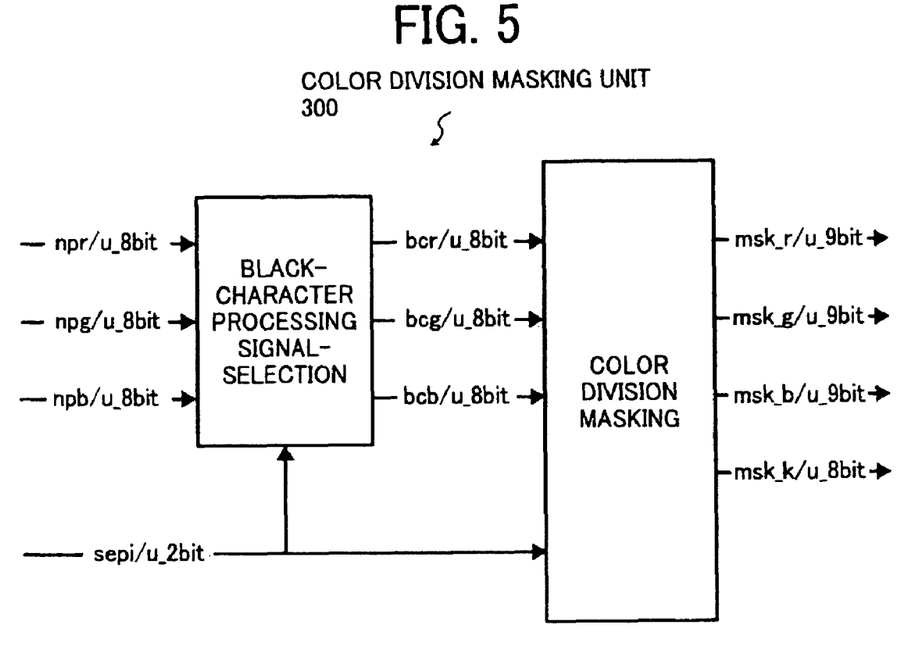
FIG. 5 is a schematic of a structure of a color-division masking unit.

The color conversion process 51, which is the salient feature of the present invention, includes a color-domain determining unit 200 that is shown in FIG. 4 and a color division masking unit 300 that is shown in FIG. 5.

The color-domain determining unit 200 that is shown in FIG. 4 converts image signals (snpr, snpg, snpb:8 bit) into color signals (HUE:8 bit), compares with setting values of a color boundary register (HUE00 to HUE11:8 bit), and based on the results, determines the color boundary (12 divisions) and outputs color domain signals (Huejo:4 bit).

A flow of the processes performed by the color-domain determining unit 200 that is shown in FIG. 4 is explained below.

Color-difference signals (X, Y:s_9 bit) are generated from the image signals (snpr, snpg, snpb:u_8 bit).
X=snpg−snpr
Y=snpb−snpg
However, when X is greater than or equal to 0, it is assumed that X=X/2.

Wide-spectrum color signals (HUEH:u_3 bit) are generated from the color-difference signals (X, Y:s_9 bit). The wide-spectrum color signals (HUEH) indicate positions when an X-Y signal plane is divided into eight parts (see FIG. 6).

Figure 6:
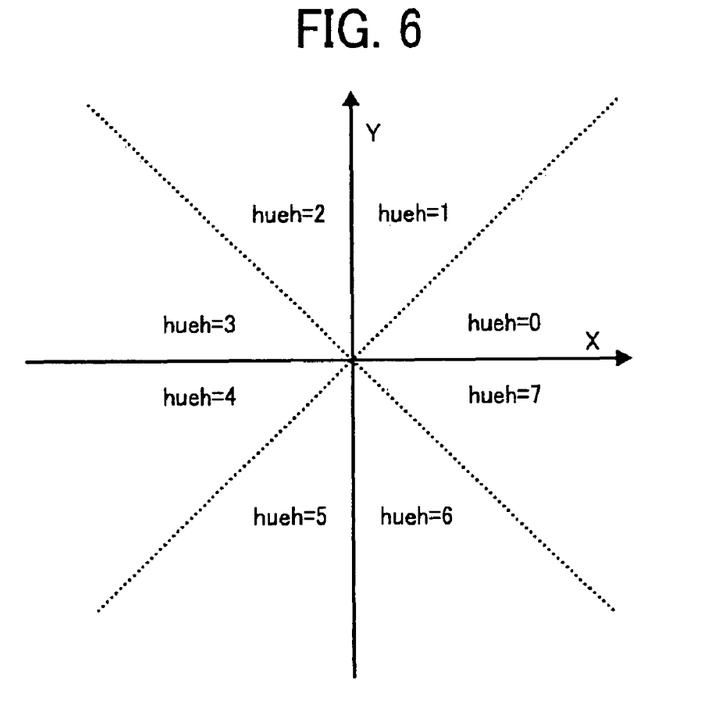
FIG. 6 is a graph for explaining a relationship between an X-Y signal plane divided into eight parts and wide-spectrum color signals (HUEH)

Wide spectrum colors are detected by using the following conditional expressions.
    !HT1 and HT0 HUEH=0
    !HT2 and HT1 HUEH=1
    !HT3 and HT2 HUEH=2
    !HT4 and HT3 HUEH=3
    !HT5 and HT4 HUEH=4
    !HT6 and HT5 HUEH=5
    !HT7 and HT6 HUEH=6
    !HT0 and HT7 HUEH=7
For other than the mentioned earlier, (Y=X=0) HUEH=7
where HT0 to HT7 are
    HT0=(Y≧0)
    HT1=(Y≧X)
    HT2=(X≦0)
    HT3=(Y≦−X)
    HT4=(Y≦0)
    HT5=(Y≦X)
    HT6=(X≧2)
    HT7=(Y≧−X)

The color-difference signals (XA, YA:S9 bit) are generated depending on the wide-spectrum color signals (HUEH:3 bit). The color-difference signals (XA, YA) are coordinates when the color-difference signal plane (X, Y) is rotated and moved to the domain of HUEH=0.
    When HUEH=0, XA=X, YA=Y
    When HUEH=1, XA=X+Y, YA=−X+Y
    When HUEH=2, XA=Y, YA=−X
    When HUEH=3, XA=−X+Y, YA=−X−Y
    When HUEH=4, XA=−X, YA=−Y
    When HUEH=5, XA=−X−Y, YA=X−Y
    When HUEH=6, XA=−Y, YA=X
    When HUEH=7, XA=X−Y, YA=X+Y Narrow-spectrum color signals (HUEL:5 bit) are generated from the color-difference signals (XA, YA:S9 bit). The narrow-spectrum color signals (HUEL) indicate a tilt (HUEL/32=YA/XA) of coordinates of color-difference signal plane.
    XA is 0, HUEL=0x1F
("0x" indicates that "1F" is a hexadecimal numeral.)
    For other than the mentioned earlier, HUEL=(YA<<5)/XA
("YA<<5" indicates that "YA" should be shifted to the left by "5" bits.)

Setting values of the color boundary register (HUE00 to HUE11:8 bit) are output, which satisfy an expression 0≦HUE00≦HUE01≦HUE02≦ ≦HUE10≦HUE11<0xFF.

Boundary register setting values can changeover depending on image-area discrimination signals (sepi/u_2 bit). For example, the color boundary signals can changeover in the picture mode and the character mode.

In FIG. 1, the characteristics of the RGB signals (images) that are input into the second image data processing unit 4 are matched with the characteristics such as CIE-RGB by using the first image data processing unit 2 and external printer driver etc. However, exceptionally when an RGB image that has characteristics different than the external I/F 12 is input, a suitable boundary register setting value according to ICC profile data is set by the CPU 6.

For example, when the RGB image that does not directly carry a profile is input from the external I/F 12, the CPU 6 checks with the sRGB and sets as the boundary register setting value an sRGB value that has the color similar to a color boundary register setting value defined by CIE-RGB.

Moreover, the CPU 6 checks from the metadata the image that is imported using the scanner and the image that is input from the external I/F 12 and created on the PC, and changes the boundary register setting values.

For example, for the image that is imported using the scanner and converted to a matched RGB by using the first image data processing unit 2, a value of the matched RGB that assumes the chromaticity point (see FIG. 1) of primary colors and secondary colors of printing ink as a base is set as the boundary register setting value. For an image such as business graphics that is input from the external I/F 12 and created on the PC, a value of the matched RGB that assumes the chromaticity point (see FIG. 1) of the primary colors and the secondary colors of sRGB as the base is set as the boundary register setting value.

The boundary register setting values can also be changed depending on input-output conditions set by the user. For example, changing the boundary register setting values is not limited only to image quality modes such as "character priority" and "photograph priority" set when copying and image scanning, and types of the original. Moreover, the boundary register setting value can be changed according to image output conditions that include edition function as typified by image collection and image composition.

As mentioned earlier, in a single output, for the image that is converted into the matched RGB using the first image data processing unit 2 and imported using the scanner, a value of the matched RGB that assumes the chromaticity point (see FIG. 1) of the primary colors and the secondary colors of printing ink as the base is set as the boundary register setting value. For the image such as business graphics that is input from the external I/F 12 and created on the PC, a value of the matched RGB that assumes the chromaticity point (see FIG. 1) of the primary colors and the secondary colors of sRGB as the base is set as the boundary register setting value. However, when printing such images by collecting on one page, the value of the matched RGB that assumes the chromaticity point of the primary and the secondary colors of the printing ink as the base is set as a common boundary register setting value. On the other hand, when the images are collected on one page and distributed from the external I/F 12, the value of the matched RGB that assumes the chromaticity point of the primary colors and the secondary colors of sRGB as the base is set as the common boundary register setting value.

Thus, the boundary register setting values are also changed according to a combination of the input-output conditions set by the user.

The color boundary signals (HUE00 to HUE11:8 bit) are compared with the color signals (HUEHL{HUEH, HUEL}:8 bit) and the color domains (HUE:4 bit) are created.

HUE00<HUEHL≦HUE01 HUE=1
HUE01<HUEHL≦HUE02 HUE=2
HUE02<HUEHL≦HUE03 HUE=3
HUE03<HUEHL≦HUE04 HUE=4
HUE04<HUEHL≦HUE05 HUE=5
HUE05<HUEHL≦HUE06 HUE=6
HUE06<HUEHL≦HUE07 HUE=7
HUE07<HUEHL≦HUE08 HUE=8
HUE08<HUEHL≦HUE09 HUE=9
HUE09<HUEHL≦HUE10 HUE=10
HUE10<HUEHL≦HUE11 HUE=11

For other than the mentioned earlier, HUE=0

Furthermore, the last condition is equivalent to (HUE11<HUEHL) && (HUEHL<HUE00). "&&" indicates "and".

Based on the color hues derived using the color-domain determining unit 200 that is shown in FIG. 4, the color division masking unit 300, which is shown in FIG. 5, performs a masking operation according to the colors. On selecting an RGB signal for black character processing at an input stage, RGB to RGB masking operation is performed.

For black character processing that is applied by discrimination signals at the time of achromatic characters (=black characters), a black character processing signal-selecting unit 301 that is shown in FIG. 5 selects the RGB signals that are used in masking by using parameters bc and ming.

When the discrimination signals are achromatic characters and the black character processing is valid (parameter bc=1), the RGB data is aligned and output. When the RGB data is aligned and output, if the parameter ming is 1, a minimum value of the input RGB data (npr, npg, npb:u_8 bit) is RGB output (bcr, bcg, bcb:u_8 bit) and if the parameter ming is 0, input G data is RGB output (bcr, bcg, bcb:u_8 bit).

If other than the mentioned earlier, the input RGB data (npr, npg, npb:u_8 bit) is output as the RGB data. In a process block in which a product-sum operation is carried out for a masking operation shown in FIG. 5 or for a linear masking of 12 color divisions, the process is independently performed for each of the colors RGBK (red, green, blue, and black). Based on color determining signal HUE that is derived from the color domain determination, a color correction factor and a color correction constant are selected and an operation is performed.

$$\text{Sum\_}X = \text{coef\_}r[hue]*bcr + \text{coef\_}g[hue]*bcg + \text{coef\_}b[hue]*bcb + \text{const}*256 + 128 \ (X{:}RGBK)$$

$$\text{Msk\_}X = \text{sum\_}X >> 8 \ (X{:}RGBK)$$

("sum_X>>8" indicates that "sum_X" should be shifted to the right by "8" bits.)

Lower 8 bits of the product-sum operation result of the linear masking for each color are rounded off and Msk_R, Msk_G, Msk_B, Msk_K are output by limiting a range as follows.

RGB 9 bits (0 to 511)
K 8 bits (0 to 255)

Various examples of the color adjustment (correction) and the color processing that use the color conversion process 51 are given below. An output parameter corresponding to the specified color domain is taken as 0, the color specified by the user is deleted, and the image is output. Alternatively, another combination (CMYK and RGB) of output colors is substituted, the specified color is changed, and the image is output. Further, brightness adjustment, contrast adjustment, color balance adjustment etc. can be performed for the color of the specified color domain.

Figure 7:
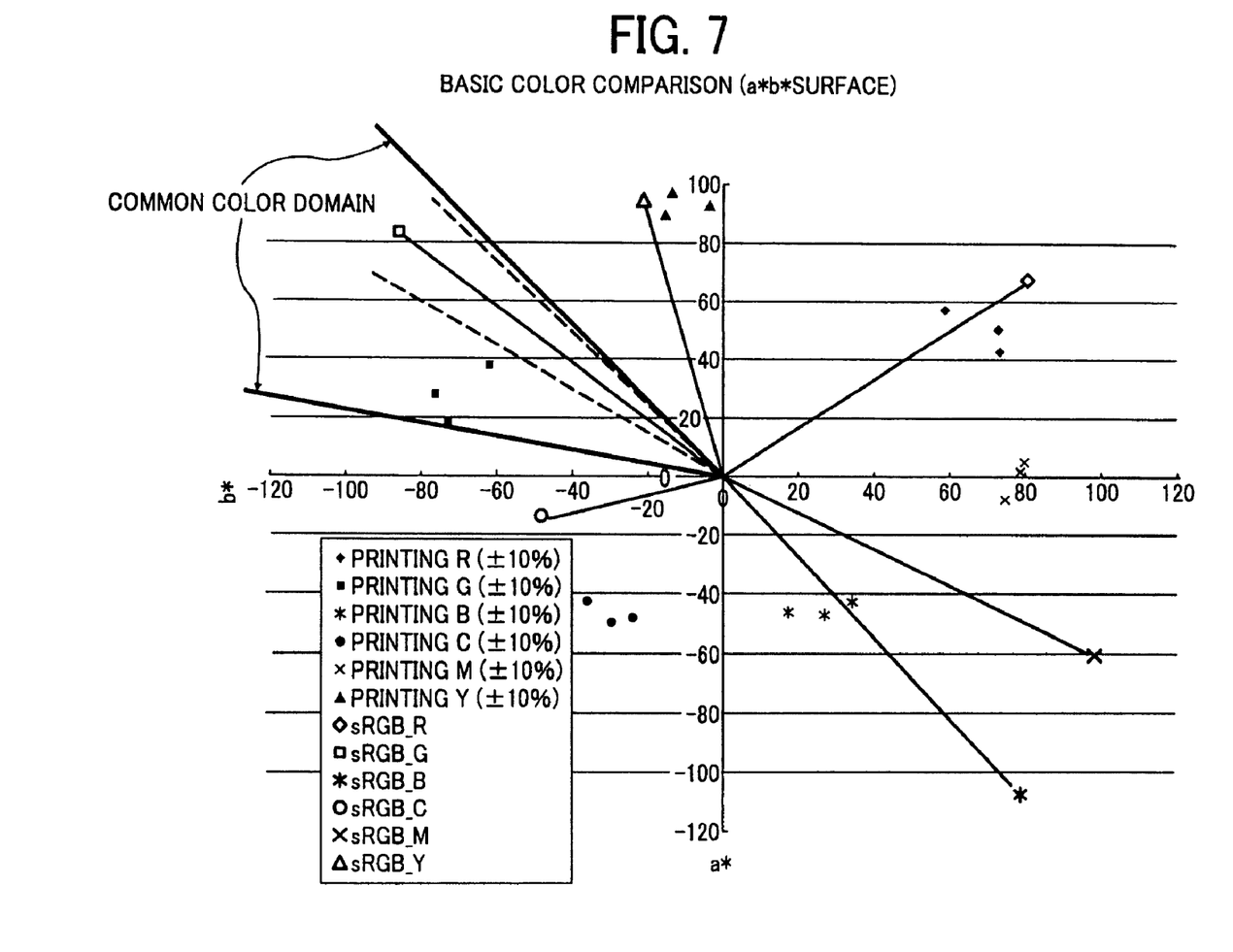
FIG. 7 is a graph for explaining that a value of matched RGB that can reproduce green color of a common color domain is set as a boundary register setting value.

In case of two-color output in which the colors other than the colors in a green color domain are converted into achromatic colors, in a single output, for the image that is converted into the matched RGB using the first image data processing unit 2 and imported using the scanner, a value of the matched RGB that assumes the chromaticity point (see FIG. 1) of green color, which is a secondary color of the printing ink, as a center is set as the boundary register setting value. For the image such as business graphics that is input from the external I/F 12 and created on the PC, the value of the matched RGB that assumes the chromaticity point of green color of sRGB signals as the center is set as the boundary register setting value. However, when such images are collected on one page and printouts are taken by carrying out image composition, the value of the matched RGB that can reproduce the green color of a common color domain (see FIG. 7) is set as the boundary register setting value.

According to an aspect of the present invention, for RGB input images having various characteristics, color correction and color processing can be suitably executed depending on colors and color saturation.

Furthermore, according to another aspect of the present invention, for the RGB input images in which graphics or characters that include line work and halftone photographs are combined, color correction and color processing can be suitably executed depending on the colors and the color saturation.

Moreover, according to still another aspect of the present invention, in a digital color multifunction peripheral (MFP) that handles various color input-output images, which include the images exchanged by an external interface (I/F), an image processing apparatus can be provided that can suitably execute color correction and color processing depending on the colors and the color saturation.

Furthermore, according to still another aspect of the present invention, in the digital color MFP that handles various color input-output images, which include the images exchanged by the external I/F, the image processing apparatus can be provided that can execute color correction and color processing depending on the colors and the color saturation complying with input-output conditions set by a user.

Moreover, according to still another aspect of the present invention, a color domain determination in the image processing apparatus includes a plurality of processes and at least color rotational transfer process. Therefore, in the digital color MFP that handles various color input-output images, which include the images exchanged by the external I/F, even with circuitry simplification, the image processing apparatus can be provided that can execute color correction and color processing depending on the colors and the color saturation.

Furthermore, according to still another aspect of the present invention, in a second image data processing unit of the image processing apparatus, when converting from matched RGB signals to two-dimensional image signals that indicate a color plane, conversion is done into a color plane in which an achromatic color in RGB color spaces is assumed as an origin. Therefore, in the digital color MFP that handles various color input-output images, which include the images exchanged by the external I/F, even with circuitry simplification, the image processing apparatus can be provided that can execute color correction and color processing depending on several color boundaries adapted to the input-output conditions set by the user.

Moreover, according to still another aspect of the present invention, metadata of the image data in the image processing apparatus includes at least image area discrimination data of pixel units, and a color domain is determined according to attributes of pixel units. Therefore, in the digital color MFP that handles various color input-output images, which include the images exchanged by the external I/F, for input images in which line work and characters, and halftone photographs are combined, the image processing apparatus can be provided that can suitably perform color correction and color processing depending on the colors and the color saturation.

Furthermore, according to still another aspect of the present invention, the metadata of the image processing apparatus includes at least an image output mode that is set by the user at the time of image input and the color domain is determined according to the image output mode. Therefore, in the digital color MFP that handles various color input-output images, which include the images exchanged by the external I/F, considering an output image quality desired by the user, the image processing apparatus can be provided that can suitably perform color correction and color processing depending on the colors and the color saturation.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing method comprising:
converting an input color image signal into a converted color image signal in a unified color space;
determining a color domain based on the converted color image signal; and
executing a color correction process according to a color domain specified in a request from a user and based on the color domain that has been determined in the determining,
wherein the determining is performed depending on a source of the input image signal.

2. An image processing apparatus comprising:
an image reading unit that reads a document to obtain digital image data of the document;
an image writing unit that prints the image data on a recording medium;
a storing unit that stores therein the image data and metadata of the image data;
an external interface unit that exchanges the image data and the metadata with an external device;
a first image data processing unit that processes the image data from the image reading unit;
a second image data processing unit that processes the image data from the storing unit; and
a bus control unit that connects the image reading unit, the image writing unit, the storing unit, the external interface unit, the first image data processing unit, and the second image data processing unit with each other, wherein
the first image data processing unit converts the input image data into an RGB signal with unified property, and
the second image data processing unit detects the color domain based on a two-dimensional image signal representing a color plane converted from the RGB signal with unified property and determines the color domain according to the metadata when executing a color correction process corresponding to a requested color domain.

3. The image processing apparatus according to claim 2, wherein the second image data processing unit determines the color domain by performing at least a color rotational transfer process.

4. The image processing apparatus according to claim 2, wherein the color plane is a plane whose origin is an achromatic color in the RGB color space.

5. The image processing apparatus according to claim 2, wherein the metadata includes at least image area discrimination data in units of pixel, and the second image data processing unit determines the color domain according to attributes in units of pixel.

6. The image processing apparatus according to claim 2, wherein the metadata includes at least an image output mode set at a time of inputting an image, and the second image data processing unit determines the color domain according to the image output mode.

7. An image processing apparatus comprising:

an image reading unit that reads a document to obtain digital image data of the document;

an image writing unit that prints the image data on a recording medium;

a storing unit that stores therein the image data and metadata of the image data;

an external interface unit that exchanges the image data and the metadata with an external device;

a first image data processing unit that processes the image data from the image reading unit;

a second image data processing unit that processes the image data from the storing unit; and a bus control unit that connects the image reading unit, the image writing unit, the storing unit, the external interface unit, the first image data processing unit, and the second image data processing unit with each other, wherein the first image data processing unit converts the input image data into an RGB signal with unified property, and the second image data processing unit detects the color domain based on a two-dimensional image signal representing a color plane converted from the RGB signal with unified property and determines the color domain according to the metadata and an image output condition when executing a color correction process corresponding to a requested color domain.

8. The image processing apparatus according to claim 7, wherein the second image data processing unit determines the color domain by performing at least a color rotational transfer process.

9. The image processing apparatus according to claim 7, wherein the color plane is a plane whose origin is an achromatic color in the RGB color space.

10. The image processing apparatus according to claim 7, wherein the metadata includes at least image area discrimination data in units of pixel, and the second image data processing unit determines the color domain according to attributes in units of pixel.

11. The image processing apparatus according to claim 7, wherein the metadata includes at least an image output mode set at a time of inputting an image, and the second image data processing unit determines the color domain according to the image output mode.

12. The image processing method according to claim 1, wherein, in the determining, setting values of color boundary registers for the converted color image signal are compared to determine a color boundary and output a color domain signal corresponding to the color domain.

* * * * *